United States Patent
Nagasaka et al.

(10) Patent No.: US 6,984,784 B2
(45) Date of Patent: Jan. 10, 2006

(54) ELECTRONIC EQUIPMENT SYSTEM FOR VEHICLE

(75) Inventors: Yasuhiro Nagasaka, Bangalore (IN); Tsuneo Shiga, Nukata-gun (JP); Masaaki Murata, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 66 days.

(21) Appl. No.: 10/343,919

(22) PCT Filed: Aug. 7, 2001

(86) PCT No.: PCT/JP01/06780

§ 371 (c)(1),
(2), (4) Date: Apr. 1, 2003

(87) PCT Pub. No.: WO02/12023

PCT Pub. Date: Feb. 14, 2002

(65) Prior Publication Data

US 2003/0167094 A1   Sep. 4, 2003

(30) Foreign Application Priority Data

Aug. 8, 2000   (JP)   .............................. 2000-239687

(51) Int. Cl.
*H01S 15/00*   (2006.01)

(52) U.S. Cl. .................. 174/50; 174/50.51; 174/50.54; 174/52.1; 361/814; 361/725; 361/796; 361/801; 340/687; 340/525; 340/426; 340/457; 340/825.2; 340/825.21; 340/825.02; 307/10.2

(58) Field of Classification Search .................. 174/50, 174/50.51, 50.52, 50.54, 52.1; 361/814, 361/725, 796, 801; 340/687, 525, 426, 457, 340/825.2, 825.02, 825.21; 307/10.2
See application file for complete search history.

(56) References Cited

U.S. PATENT DOCUMENTS

| | | | |
|---|---|---|---|
| 5,510,957 A * | 4/1996 | Takagi | ........................ 361/814 |
| 5,889,337 A | 3/1999 | Ito et al. | |
| 6,040,760 A * | 3/2000 | Kataoka et al. | .......... 340/425.5 |
| 6,107,929 A | 8/2000 | Amari | |
| 6,130,727 A | 10/2000 | Toyozumi | |
| 6,441,510 B1 * | 8/2002 | Hein et al. | .................. 307/10.1 |

FOREIGN PATENT DOCUMENTS

EP   0 875 422 A2   11/1998

(Continued)

*Primary Examiner*—Dean A. Reichard
*Assistant Examiner*—Anton Harris
(74) *Attorney, Agent, or Firm*—Oliff & Berridge, PLC

(57) ABSTRACT

An electronic equipment system includes a housing 20 and a plurality of modules 31 to 35, which are removably built in and fixed to the housing 20. The modules 31 to 34 includes a liquid crystal display 31*a*; a graphic control circuit 32*a*1 and a navigation control circuit 32*a*2; an MD unit 33*a*; and a CD unit 34*a*, respectively. The module 35 is formed through integration of control sections, such as constant-voltage circuits for power supply, which achieve a function that is common among the graphic control circuit and the navigation control circuit, the MD unit, and the CD unit. Thus, it becomes possible to replace only necessary one among the modules 31 to 34, thereby reducing cost necessary for upgrading of the system.

5 Claims, 5 Drawing Sheets

FOREIGN PATENT DOCUMENTS

| | | |
|---|---|---|
| EP | 0 925 989 A2 | 6/1999 |
| JP | A 9-286287 | 11/1997 |
| JP | A 10-272993 | 10/1998 |
| JP | A 11-17358 | 1/1999 |
| JP | A 11-180222 | 7/1999 |
| JP | A 11-348678 | 12/1999 |
| JP | A 2000-90653 | 3/2000 |
| JP | A 2000-95032 | 4/2000 |

* cited by examiner

ELECTRONIC EQUIPMENT SYSTEM FOR VEHICLE

TECHNICAL FIELD

The present invention relates to a vehicle electronic-equipment system which is mounted on a vehicle and includes a plurality of electronic equipment subsystems each performing a certain operation in response to an operation of an occupant.

BACKGROUND ART

In general, such a vehicle electronic-equipment system is configured in the form of an aggregate of subsystems including a navigation system; an audio system including a radio and a cassette deck; a compact disk (CD) system; and a mini-disc (MD) system. Each of these subsystems is composed of a single electronic equipment unit, or a unit group including two electronic equipment units, in order to provide a required specific operation.

A manner of mounting the above-described vehicle electronic-equipment system onto a vehicle will be described with reference to FIG. 6. In the illustrated example, an electronic control unit 61 for a navigation system is disposed within a trunk of the vehicle; and a display control unit 62, which communicates with the electronic control unit 61 and displays necessary information on a display, is disposed within an instrument panel 66 of the vehicle, together with an electronic equipment unit 63 for an audio system, an electronic equipment unit 64 for a CD system, and an electronic equipment unit 65 for an MD system.

As schematically shown in FIG. 6, the electronic control unit 61 for the navigation system includes a power supply circuit 61b and a communication control section 61a for communication with other modules. The display control unit 62 includes a communication control section 62a, a power supply circuit 62b, a graphic control circuit 62c for controlling the display (graphics) on the display, and a switch circuit 62d for processing switch input. The electronic equipment unit 63 for the audio system includes a communication control section 63a, a power supply circuit 63b, a radio tuner circuit 63c, a switch circuit 63d, and an audio circuit 63e for amplifying an input signal and outputting an amplified signal.

The electronic equipment unit 64 for the CD system includes a communication control section 64a, a power supply circuit 64b, an audio circuit 64c, a switch circuit 64d, and a mechanical section 64e including a mechanism for driving a CD so as to read information from the CD. Similarly, the electronic equipment unit 65 for the MD system includes a communication control section 65a, a power supply circuit 65b, an audio circuit 65c, a switch circuit 65d, and a mechanical section 65e including a mechanism for driving an MD so as to read information from the MD.

Incidentally, Japanese Patent Application Laid-Open (kokai) No. 2000-95032 discloses a system which is composed of a base unit including an audio equipment control circuit, a switch input circuit, an operation panel, a connector, and a display device; and a plurality of modules which are removably fixed to the base unit. This technique enables free selection and combination of audio equipment units to thereby enable easy upgrading of the system.

However, the electronic equipment units 61 to 65 used in the above-described general system redundantly include functional sections which could be used commonly among the electronic equipment units 61 to 65; e.g., communication control sections 61a, 62a, 63a, 64a, and 65a; power supply circuits 61b, 62b, 63b, 64b, and 65b; switch circuits 62d, 63d, 64d, and 65d; and audio circuits 63e, 64c, and 65c (hereinafter, those sections which can be used commonly among two or more electronic equipment units may be referred to as "control sections"), thereby raising a problem of increased cost. Further, at the time of upgrading or modification of the system, replacement must be performed on a unit-by-unit basis. Therefore, the control section that does not have to be replaced is inevitably replaced, also raising a problem of increased cost.

Meanwhile, the technique disclosed by Japanese Patent Application Laid-Open No. 2000-95032 enables free selection and attachment of modules which are suitable for (adapted to) the audio equipment control circuit contained in the base unit. However, when a unit which is not suitable for the audio equipment control circuit is to be attached, the base unit itself must be replaced with another base unit, resulting in replacement of switches, a display device, etc., which are not required to be replaced. As a result, cost involved in upgrading increases.

DISCLOSURE OF THE INVENTION

The present invention has been accomplished in order to solve the above-described problems and provides an electronic equipment system for a vehicle which includes an operation section, a plurality of peculiar sections each having a peculiar configuration for effecting a specific operation and being physically separated from other sections, a control section having a physically integrated portion which provides a common function to two or more physically separated peculiar sections, and a housing, the operation section, the plurality of peculiar sections, and the control section being mounted to the housing, and the system being configured in such a manner that in response to operation of the operation section, one peculiar section among the plurality of peculiar sections and the control section cooperate to provide the specific operation of the one peculiar section, wherein at least one of the peculiar sections and the control section are configured to be mounted to and removed from the housing independently.

Since mounting and removal (replacement) of at least one peculiar section and the control section can be performed individually; i.e., since some of the peculiar sections and the control section can be replaced individually without replacement of the operation section, the peculiar section, and/or the control section not required to be replaced, only a portion required to be replaced for modification or upgrading of the system can be replaced. As a result, cost involved in the replacement can be suppressed. Further, in the case in which the existing control section is not suitable for (cannot cope with) an upgraded peculiar function section, the control section can be replaced with a different control section, independently of the operation section. Thus, the cost involved in the replacement of the control section can be suppressed.

Further, in the control section, portions which provide a common function to at least two or more peculiar sections among peculiar sections of a plurality of electronic equipment subsystems are physically integrated This configuration eliminates useless redundancy in the entire system, and thus can reduce the system cost.

Preferably, the peculiar sections and the control section are removably mounted to the housing which is removably mounted to the vehicle.

This configuration can unify and simplify the casings of electronic equipment units, which have conventionally been provided individually, and thus can reduce the system cost. Further, this configuration enables the electronic equipment system to be assembled in a line independent of a vehicle assembly line, and then built into the vehicle as an integrated unit. This facilitates the operation of building the system into the vehicle.

The housing is removably mounted to the vehicle and has an opening in a face which faces the rear of the vehicle when the housing is mounted to the vehicle; and the at least one peculiar section and the control section are configured to be inserted into the housing from the opening of the housing and be removably mounted to the housing.

Preferably, the opening of the housing is closed by a panel removably attached to the housing; and the operation section is provided on the panel in a physically integrated manner.

Since this configuration enables integration of the operation section and a cover of the housing, system cost can be reduced. Further, when the panel is fabricated to have a design suitable for each vehicle model, the peculiar sections and the control section are not required to have a design suitable for each vehicle model. This reduces the number of types of parts to thereby reduce the system cost.

Preferably, the operation section of the panel includes a plurality of switches each being electrically connected to the peculiar section or the control section via a switch circuit integrally provided on the panel.

In this configuration, since a conventional switch circuit is integrated with the operation section, the switch circuit is not required to be replaced simultaneously with replacement of the peculiar section or the control section. Thus, cost involved in upgrading or the like can be suppressed.

Preferably, the peculiar portions and the control section are formed on corresponding mounting substrates; the housing has a plurality of slits on an inner wall surface thereof; and the peculiar portions and the control section are fixed to the housing in a state in which edge portions of the mounting substrates are received by the corresponding slits.

Since this configuration enables precise positioning of the peculiar sections and the control section through a simple operation of inserting the substrates of the peculiar sections and the control section into the corresponding slits, the system can be manufactured with ease, and the positional relationship between the operation section and the peculiar sections and that between the operation section and the control section can be maintained with ease.

An embodiment of the electronic equipment system for a vehicle according to the present invention will now be described with reference to the drawings.

BEST MODE FOR CARRYING OUT THE INVENTION

Figure 1:
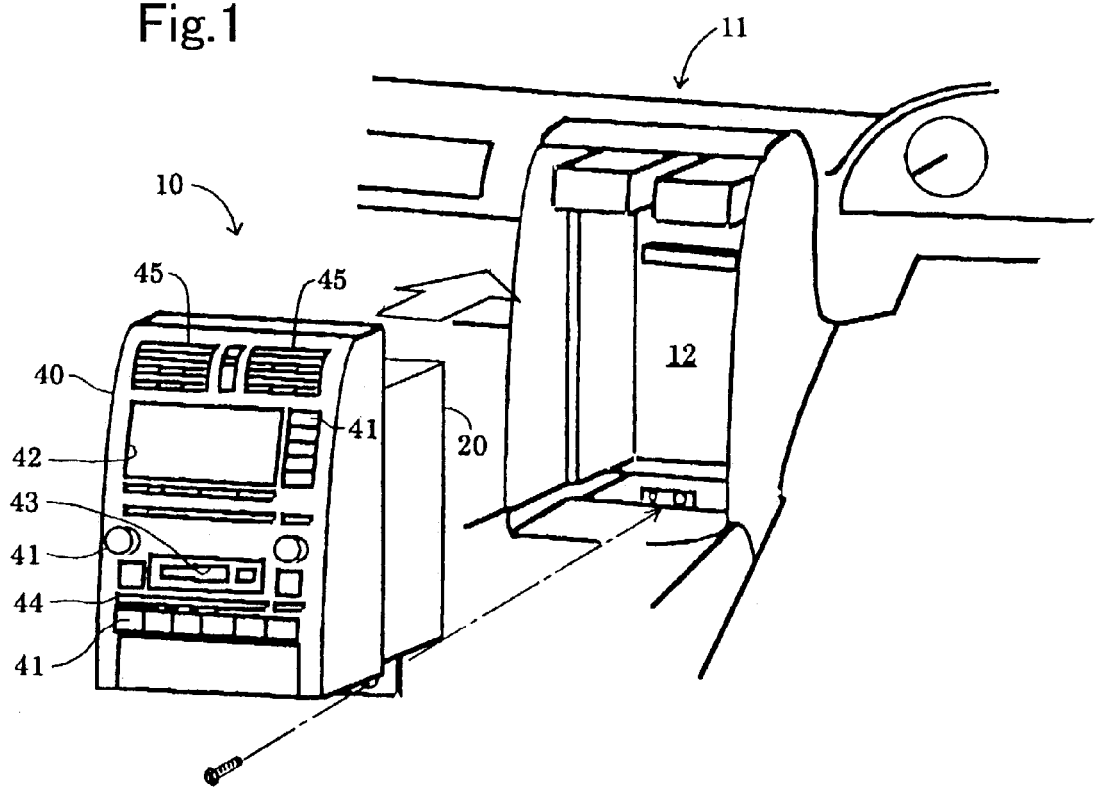
FIG. 1 is a view showing a state in which electronic equipment units according to the present invention are built into a vehicle.

As shown in FIG. 1, an electronic equipment system 10 according to the present invention is built into a space 12, which is provided within an instrument panel 11 of a vehicle to be located between a driver seat and a front passenger seat, and is fixed to the vehicle. The electronic equipment system 10 provides a specific operation (such as navigation or music play) in accordance with operation by a driver or a front passenger. The electronic equipment system 10 is composed of a housing 20, which is completely accommodated within the space 12 and fixed to the vehicle by use of bolts; a plurality of modules 31 to 35, which are removably built in and fixed to the housing 20, as shown in FIG. 2 (exploded perspective view of the system) and FIG. 3 (schematic sectional view of the system); and an operation panel 40, which is removably fixed to the housing 20.

Figure 2:
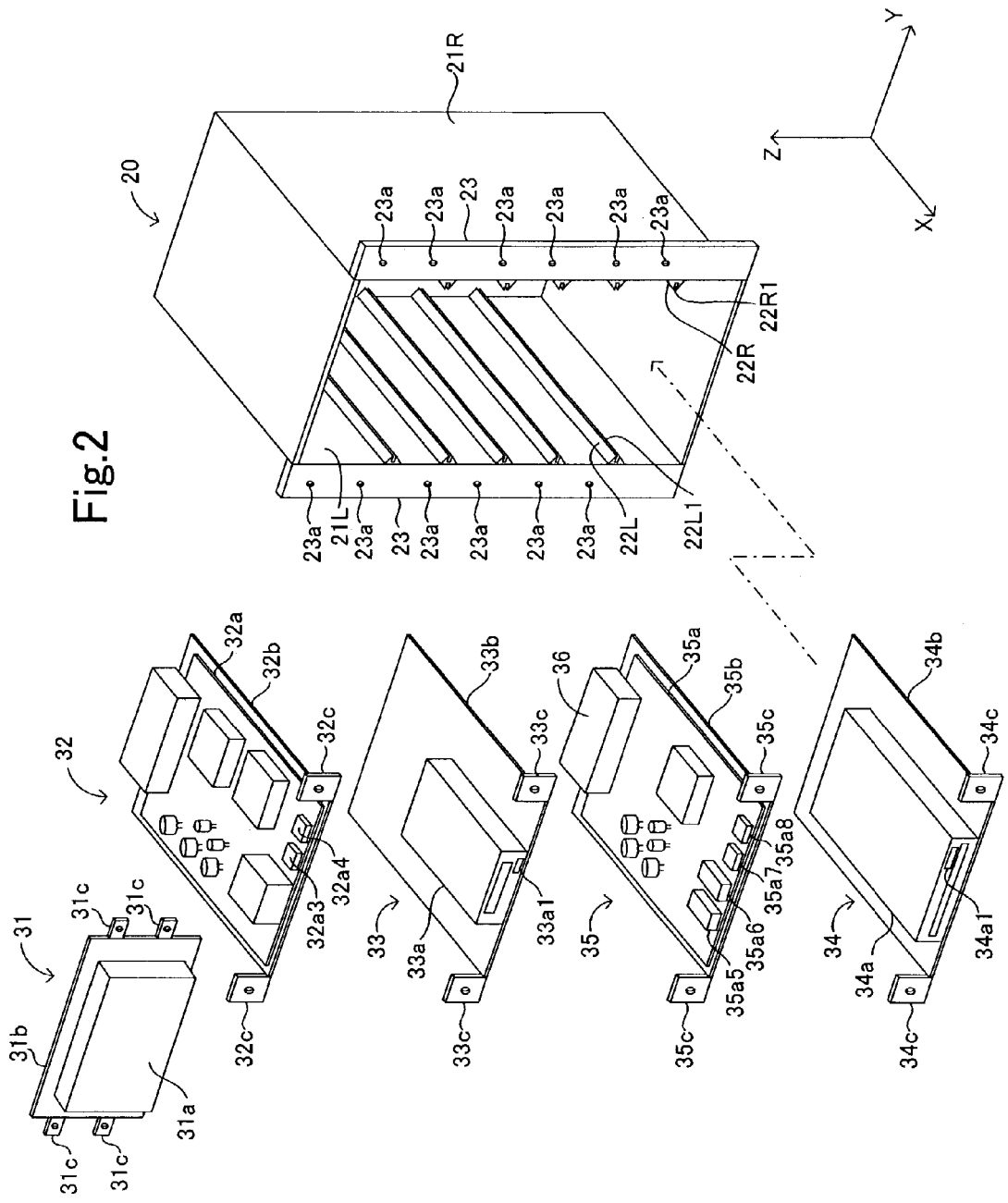
FIG. 2 is an exploded perspective view of a housing shown in FIG. 1 and modules to be built into the housing.

As shown in FIG. 2, the housing 20 is a box of a generally rectangular parallelepiped shape. A face (parallel to a Y-Z plane in FIG. 2) of the housing 20 which is to face the rear of the vehicle (the positive direction along the X-axis of FIG. 2) upon being built into the vehicle is opened. Hereinafter, this opened face will be called the "open face."

A plurality of right-hand slit-forming members 22R made of resin are bonded to an inner surface of a right-hand side wall 21R of the housing 20. Each of the slit-forming members 22R extends along a direction (the X-axis direction of FIG. 2) substantially perpendicular to the open face of the housing 20 and has a slit 22R1 formed therein. Similarly, a plurality of left-hand slit-forming members 22L made of resin are bonded to an inner surface of a left-hand side wall 21L of the housing 20 at positions which correspond to those of the right-hand slit-forming members 22R with respect to the height direction (the Z-axis direction of FIG. 2). Each of the slit-forming members 22L extends along the direction substantially perpendicular to the open face of the housing 20 and has a slit 22L1 formed therein. In other words, the housing 20 is provided with a plurality of pairs of slits (rails) 22R1 and 22L1 which extend substantially along the front/rear direction of the vehicle (the X-axis direction of FIG. 2) when the housing 20 is built into the vehicle and are opened toward the center line (center) of the housing 20 with respect to the width direction (the Y-axis direction of FIG. 2).

Figure 3:
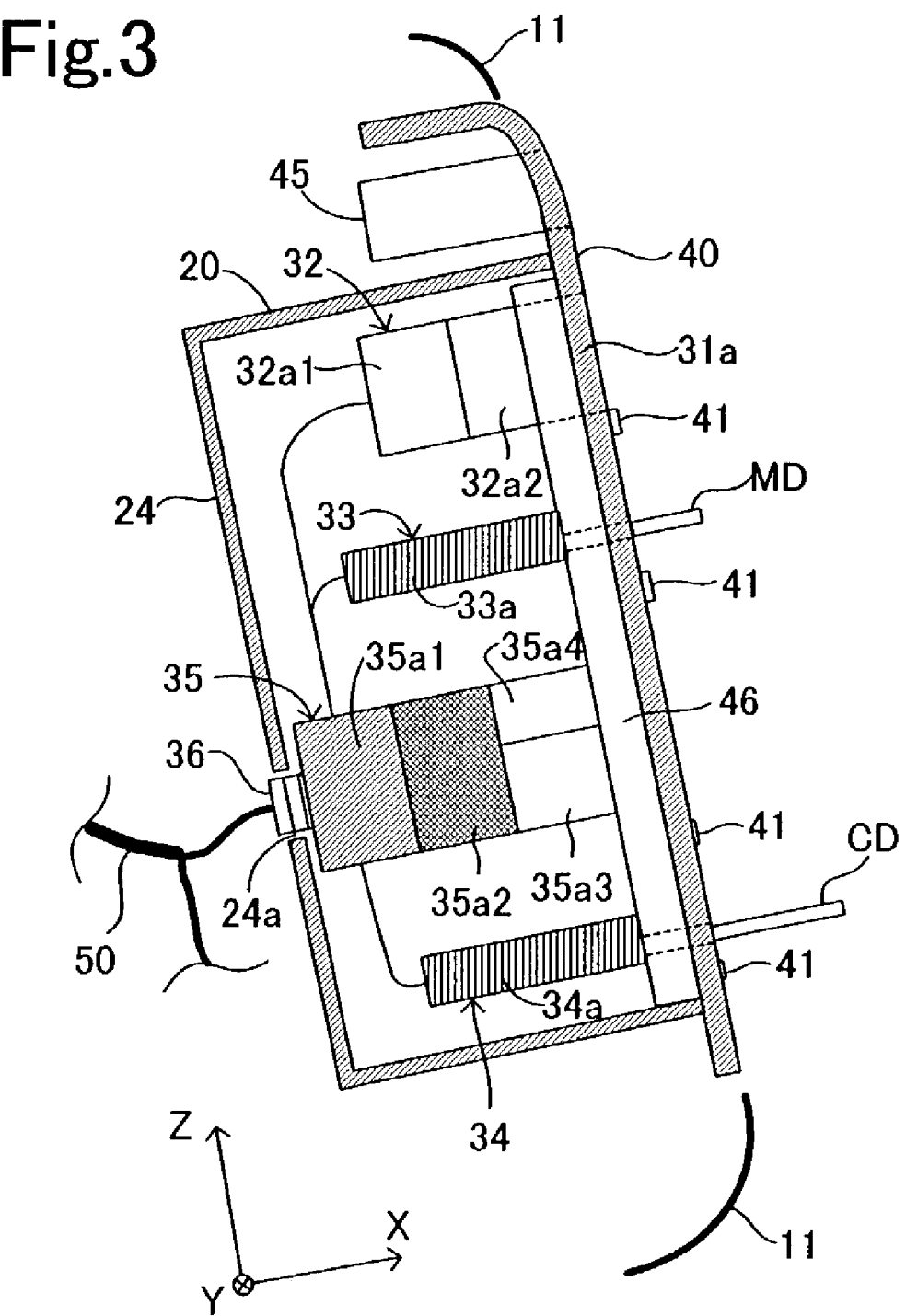
FIG. 3 is a schematic sectional view of the electronic equipment units shown in FIG. 1.
Figure 4:
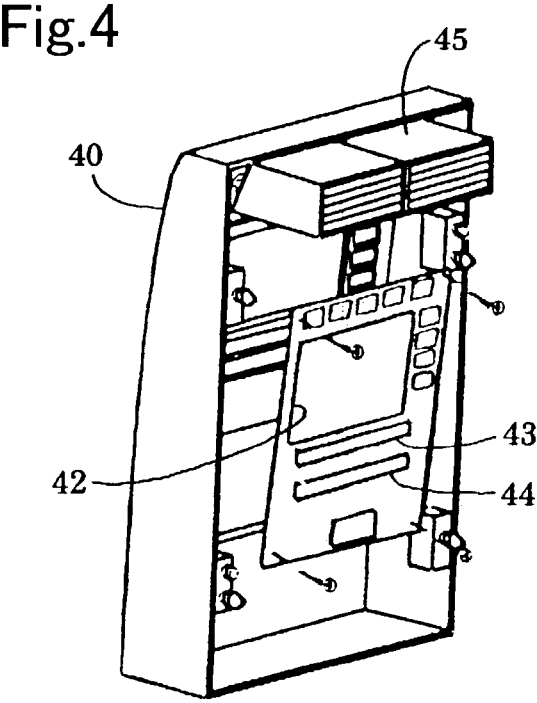
FIG. 4 is a rear perspective view of the operation panel shown in FIG. 1.

Within a plane which substantially coincides with the open face of the housing 20 are provided a pair of flanges 23 which project outward from the left-hand and right-hand side walls 21L and 21R with respect to the width direction and extend along the height direction. A plurality of bolt holes 23a are formed in each of the flanges 23 at predetermined intervals along the height direction. Moreover, as shown in FIG. 3, an opening 24a which an integrated connector 36 penetrates is formed in a face (back face) of the housing 20 opposite the open face; i.e., a face 24 which is to face the front of the vehicle (the negative direction along the X-axis) when the housing 20 is built into the vehicle.

The module 31 shown in FIG. 2 is composed of a TFT (thin film transistor)-type liquid crystal display 31a which has a substantially rectangular parallelepiped shape, and a mounting substrate 31b. The mounting substrate 31b is a thin plate which has a rectangular shape larger than the screen of the display 31a and whose longer sides have a dimension substantially equal to the distance between the left-hand and right-hand side walls 21L and 21R of the housing 20. Connectors (not shown) for connection with a power supply and for communication with the modules 32 and 35 are provided at a lower portion of the display 31a.

On each shorter side of the mounting substrate 31b, there are provided mounting portions 31c, which are formed of substantially rectangular thin plates extending outward from the mounting substrate 31b with respect to the widthwise direction. A bolt hole is formed in each of the mounting portions 31c. By virtue of the above configuration, the module 31 can be removably fixed to the housing 20 by use of bolts which are passed through the bolt holes of the mounting portions 31c and screwed into the bolt holes 23a of the flanges 23.

The module 32 is composed of a circuit board 32a and a mounting substrate 32b. The mounting substrate 32b is a rectangular thin plate whose shorter sides have a dimension substantially equal to the distance between (the bottom portions) of the left-hand and right-hand slits 22L1 and 22R1 of the housing 20. The circuit board 32a is fixed onto the mounting substrate 32b. On a plane perpendicular to the mounting substrate 32b, mounting portions 32c are provided to be located at opposite ends of one shorter side of the mounting substrate 32b. Each of the mounting portions 32c is formed by a rectangular thin plate and has a bolt hole formed therein. By virtue of the above configuration, the module 32 can be built into the housing 20 in such a manner that the longer-side edges of the mounting substrate 32b are inserted into the slits 22R1 and 22L1, and then can be removably fixed to the housing 20 by use of bolts which are passed through the bolt holes of the mounting portions 32c and screwed into the bolt holes 23a of the flanges 23.

As schematically shown in FIG. 3, a graphic control circuit 32a1 serving as a first peculiar section for controlling the display (graphics) on the display 31a and a navigation control circuit 32a2 serving as a second peculiar section are formed on the circuit board 32a shown in FIG. 2. Further, as shown in FIG. 2, a connector 32a3 for connection with the power supply and for communication with the module 35, and a connector 32a4 for connection with the module 31 are provided on the circuit board 32a at locations which are to be located adjacent to the open face of the housing 20 when the mounting substrate 32b is mounted to the housing 20.

The module 33 is composed of an MD unit 33a and a mounting substrate 33b. The MD unit 33a serves as a third peculiar section which has a mechanism (mechanical section) necessary for MD reproduction; i.e., a peculiar structure for performing reproduction of information stored in the MD. The mounting substrate 33b is formed by a thin plate having the same shape as the mounting substrate 32b; and the MD unit 33a is fixed onto the mounting substrate 33b. The mounting substrate 33b is provided with mounting portions 33c, which are formed by substantially rectangular thin plates as in the case of the mounting portions 32c; and a bolt hole is formed in each of the mounting portions 33c. By virtue of the above configuration, as in the case of the module 32, the module 33 can be removably fixed to the housing 20 by use of bolts. Further, a connector 33a1 for connection with the power supply and for communication with the module 35 is provided on the MD unit 33a at a location which is to become adjacent to the open face of the housing 20 when the mounting substrate 33b is mounted to the housing 20.

The module 34 is composed of a CD unit 34a and a mounting substrate 34b. The CD unit 34a serves as a fourth peculiar section which has a mechanism (mechanical section) necessary for CD reproduction; i.e., a peculiar structure for performing reproduction of information stored in the CD. The mounting substrate 34b is formed by a thin plate having the same shape as the mounting substrate 32b; and the CD unit 34a is fixed onto the mounting substrate 34b. The mounting substrate 34b is provided with mounting portions 34c, which are formed by substantially rectangular thin plates as in the case of the mounting portions 32c; and a bolt hole is formed in each of the mounting portions 34c. By virtue of the above configuration, as in the case of the module 32, the module 34 can be removably fixed to the housing 20 by use of bolts. Further, a connector 34a1 for connection with the power supply and for communication with the module 35 is provided on the CD unit 34a at a location which is to become adjacent to the open face of the housing 20 when the mounting substrate 34b is mounted to the housing 20.

The module 35 constitutes a control section which achieves functions (in the illustrated example, supply of constant-voltage power, amplification of signals, etc.) which are common among two or more of the graphic control circuit 32a1 and the navigation control circuit 32a2 of the module 32; the MD unit 33a; and the CD unit 34a. The module 35 is composed of a circuit board 35a and a mounting substrate 35b. The mounting substrate 35b is formed by a thin plate having the same shape as the mounting substrate 32b; and the circuit board 35a is fixed onto the mounting substrate 35b. The mounting substrate 35b is provided with mounting portions 35c, which are formed by substantially rectangular thin plates as in the case of the mounting portions 32c; and a bolt hole is formed in each of the mounting portions 35c. By virtue of the above configuration, as in the case of the module 32, the module 35 can be removably fixed to the housing 20 by use of bolts.

As schematically shown in FIG. 3, a constant-voltage circuit (constant-voltage source) 35a1 for the modules 31 to 35, a communication control section 35a2 for communicating with the modules 31 to 34 and other vehicle electronic equipment, an audio circuit 35a3 including an amplifier, and a radio tuner 35a4 are formed integrally on the circuit board 35a shown in FIG. 2. The audio circuit 35a3 is configured so as to amplify signals from the MD unit 33a, the CD unit 34a, and the tuner circuit 35a4 and to output the signals via speakers (not shown).

As shown in FIG. 2, connectors 35a5, 35a6, and 35a7 for power supply to and for communication with the modules 31, 33, and 34, respectively, and a connector 35a8 for connection with a switch circuit, which will be described later, are provided on the circuit board 35a at locations which are to become adjacent to the open face of the housing 20 when the mounting substrate 35b is mounted to the housing 20; and the above-described integrated connector 36 is provided on the circuit board 35a at a location adjacent to the back face 24 of the housing 20.

The operation panel 40 includes an integrated operation section which is operated by an occupant in order to cause the modules 31 to 35 to perform specific operations. The operation panel 40 is exposed to the interior of the vehicle when the housing 20 is built into the vehicle. Therefore, the surface of the operation panel 40 is designed to provide a sense of unity with the instrument panel 11. Further, the operation panel 40 includes a plurality of operation elements 41 such as switch buttons; a window 42 for the display 31a; an opening 43 for enabling insertion of an MD into the MD unit 33a and removal of the MD therefrom; an opening 44 for enabling insertion of a CD into the CD unit 34a and removal of the CD therefrom; and blow-off ducts 45 for a room air conditioner of the vehicle.

Moreover, as shown in FIG. 3, a switch circuit 46 is integrally provided on the back face of the operation panel 40, which faces the front of the vehicle when the housing 20 is built into the vehicle. The switch circuit 46 specifies operations of the plurality of operation elements 41 and converts signals generated by the operation elements 41 to signals which can be input to the respective modules 31 to 35.

Figure 5:
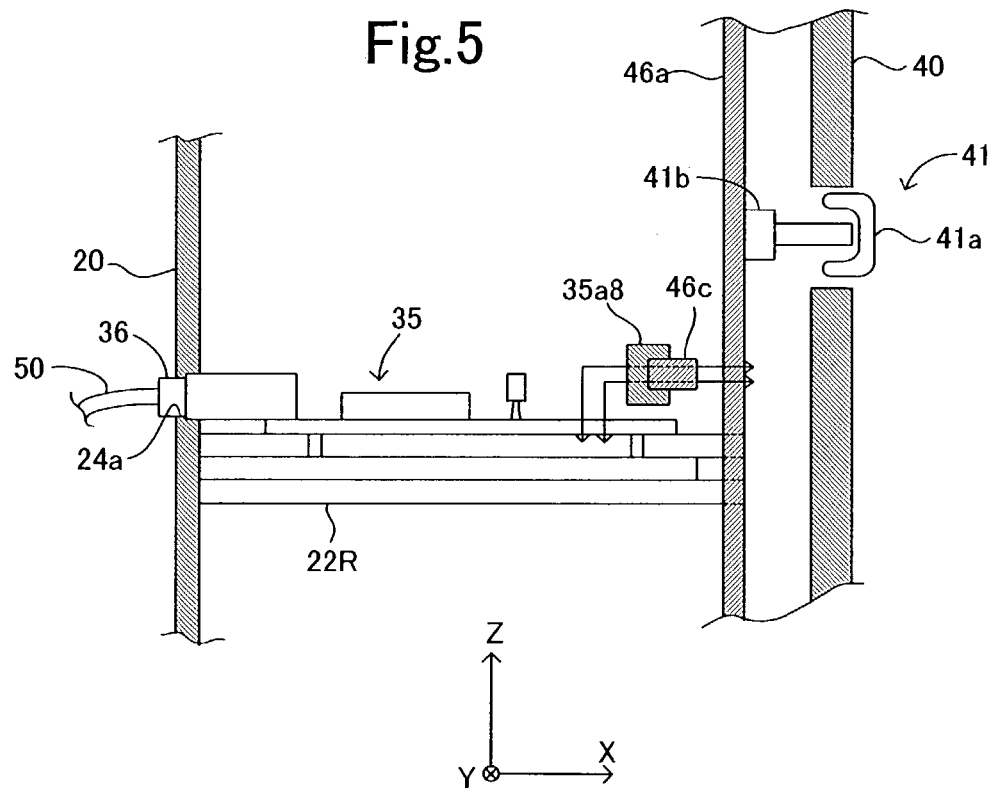
FIG. 5 is a partial sectional view of an electronic equipment unit shown in FIG. 1.
Figure 6:
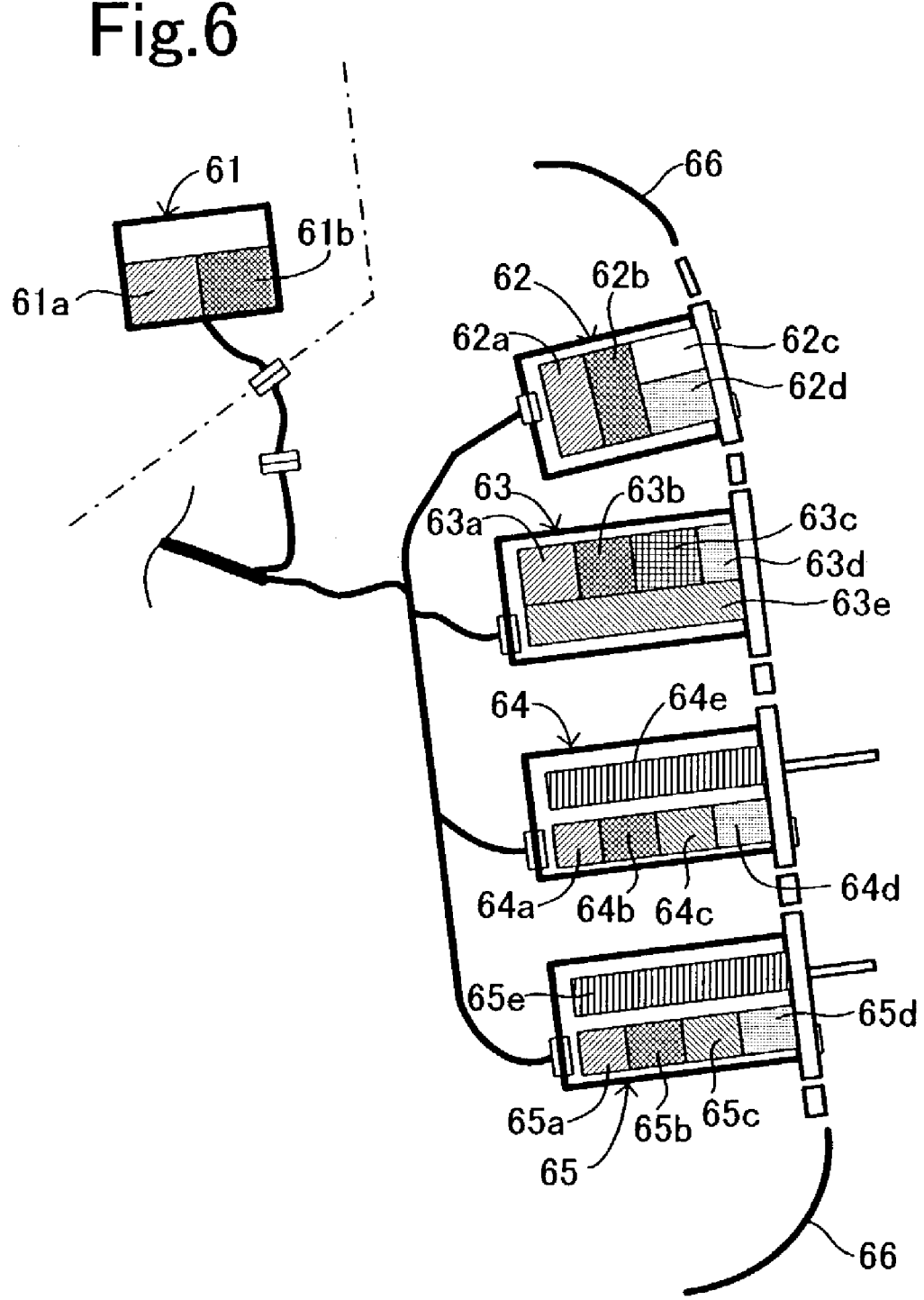
FIG. 6 is a schematic sectional view of conventional electronic equipment units.

As shown in FIG. 5, which shows a cross section of one operation element 41 and its periphery, the switch circuit 46 includes a switch board 46*a*, a tact switch 41*b*, and a connector 46*c*. The tact switch 41*b* is fixed onto the switch board 46*a*. The tact switch 41*b* alternately closes and opens every time the input shaft of the tact switch 41*b* is depressed by means of a switch knob 41*a* of the operation element 41. The connector 46*c* is solder-fixed onto the switch board 46*a* in such a manner that the connector 46*c* is electrically connected to the contacts (not shown) of the tact switch 41*b* via a predetermined switch circuit (not shown) and by means of printed wiring. The connector 46*c* has a connection portion which extends toward the front of the vehicle (the negative direction of the X-axis) when the housing 20 is fixed to the vehicle.

Next, a process of manufacturing an electronic equipment system having the above-described configuration will be described. First, the housing 20 and the modules 31 to 35 are prepared. Subsequently, the module 31 is removably fixed to the top portion of the housing 20 by use of bolts which are passed through the bolt holes of the mounting portions 31*c* of the module 31 and screwed into the bolt holes 23*a* of the flanges 23. The modules 32 to 35 are fixed to the housing 20 in the following manner. The mounting substrates 32*b*, 33*b*, 35*b*, and 34*b* are successively inserted into the housing 20 such that the mounting substrates 32*b*, 33*b*, 35*b*, and 34*b* are arranged, in this sequence from the top of the housing 20, and are received by the corresponding slits 22R1 and 22L1. Subsequently, the mounting substrates 32*b*, 33*b*, 35*b*, and 34*b* are fixed to the housing 20 by use of bolts which are passed through the bolt holes of the mounting portions 32*c*, 33*c*, 35*c*, and 34*c*, and screwed into the corresponding bolt holes 23*a* of the flanges 23.

Subsequently, the connectors are connected with one another by use of an unillustrated wire harness. Specifically, the connector (not shown) of the display 31*a* and the connector 32*a*4 are connected together; and the connector 32*a*3 and the connector 35*a*5 are connected together. Subsequently, the connector 33*a*1 and the connector 35*a*6 are connected together; and the connector 34*a*1 and the connector 35*a*7 are connected together. Subsequently, the operation panel 40 is fixed to the housing 20 by use of bolts. At this time, connection between the connector 35*a*8 and the connector 46*c* of the circuit board 46*a* is established. Subsequently, the integrated connector 36 is connected to a vehicle-side wire harness 50 shown in FIGS. 3 and 5. Finally, the housing 20 is built into the space 12 of the instrument panel 11 and fixed to the vehicle body by use of bolts. Thus, the attachment of the electronic equipment system is completed.

As described above, in the present embodiment, the module 33, which contains the MD unit 33*a* as a third peculiar section, and the module 34, which contains the CD unit 34*a* as a fourth peculiar section, are removably fixed to the housing 20 while being physically separated from other units. Further, the graphic control circuit 32*a*1 serving as a first peculiar section and the navigation control circuit 32*a*2 serving as a second peculiar section are integrated on the module 32, which is removably fixed to the housing 20, while being physically separated from other units. Moreover, the module 35 includes an integrated control section which achieves functions (power supply and signal amplification) which are common among two or more of the graphic control circuit 32*a*1 and the navigation control circuit 32*a*2; the MD unit 33*a*; and the CD unit 34*a*. The module 35 is removably fixed to the housing 20, while being physically separated from other units. Further, the operation panel 40 includes operation elements 41 such as switches and an integrated switch circuit which achieves a function for processing signals from the operation elements 41 to be fed to the modules 31 to 35, the function being required commonly among the modules 31 to 35. The operation panel 40 is removably attached to the housing 20 (i.e., the vehicle).

Accordingly, in the present embodiment, each of the modules 32, 33, and 34 can be easily replaced with a different module so as to upgrade or modify the system, such that replacement of the module 31 including the expensive display 31*a*, the module 35 serving as a control section, etc. is not needed. Therefore, cost involved in upgrading or the like can be suppressed. Moreover, even in a case in which the mounted module 35 is not suitable for (cannot cope with) an upgraded MD unit 33*a*, replacement of other modules 31, 32, and 34 is not required. In such a case, after attachment of the upgraded MD unit 33*a*, the module 35 is replaced with a different module 35 which can cope with the upgraded MD unit 33*a*. Therefore, cost involved in upgrading can be suppressed.

Moreover, in the present embodiment, only the operation panel 40 must have a design that matches the vehicle model; and the modules 31 to 35 are not required to have designs that match the vehicle model. Therefore, the types of the modules 31 to 35 can be reduced in number. Moreover, since the housing 20 serves as casings of the modules 31 to 35, the modules 31 to 35 need not have individual casings. Therefore, the sizes of the modules 31 to 35 can be reduced in order to increase mounting density and the degree of freedom in design in relation to the mount positions and system configurations of the modules 31 to 35. Further, since the electrical connection between the module 35 and the remaining modules 32 to 34 is established at the open face of the hosing 20 by use of a wire harness (connection wire) having connectors, assembly and replacement of the modules 32 to 34 can be performed with ease. In addition, the modules 32 to 35 are fittedly inserted into the slits 22L1 and 22R1 of the housing 20, thereby facilitating assembly of the modules to the housing 20 and replacement of the modules.

The present invention is not limited to the above-described embodiment, and various modifications may be employed within the scope of the present invention. For example, in the above-described embodiment, the power supply circuit commonly used among the modules 31 to 34 is provided on the module 35. However, the embodiment may be modified in such a manner that a power supply circuit commonly used between the modules 33 and 34 is provided on the module 35, and a power supply circuit commonly used between the modules 31 and 32 is provided on the module 32.

What is claimed is:

1. An electronic equipment system for a vehicle which includes an operation section, a plurality of peculiar sections each having a peculiar configuration for effecting a specific operation and being physically separated from other sections, a control section having a physically integrated portion which provides a common function to two or more physically separated peculiar sections, and a housing, said operation section, said plurality of peculiar sections, and said control section being mounted to said housing, and said system being configured in such a manner that in response to operation of said operation section, one peculiar section among said plurality of peculiar sections and said control section cooperate to provide the specific operation of said one peculiar section, said operating section having a plurality of switches each being electrically connected to at least one of said peculiar sections or to said control section via a switch circuit, wherein said control section is configured to be mounted to and removed from said housing independently.

2. An electronic equipment system according to claim 1, wherein said housing is removably mounted to the vehicle and has an opening in a face which faces the rear of the vehicle when said housing is mounted to the vehicle; and said at least one peculiar section and said control section are configured to be inserted into said housing from the opening of said housing and be removably mounted to said housing.

3. An electronic equipment system according to claim 2, wherein the opening of said housing is closed by a panel removably attached to said housing; and said operation section is provided on said panel in a physically integrated manner.

4. An electronic equipment system according to claim 3, wherein the switch circuit is integrally provided on said panel.

5. An electronic equipment system according to claim 1, wherein said peculiar portions and said control section are formed on corresponding mounting substrates; said housing has a plurality of slits on an inner wall surface thereof; and said peculiar portions and said control section are fixed to said housing in a state in which edge portions of said mounting substrates are received by said corresponding slits.

* * * * *